UNITED STATES PATENT OFFICE.

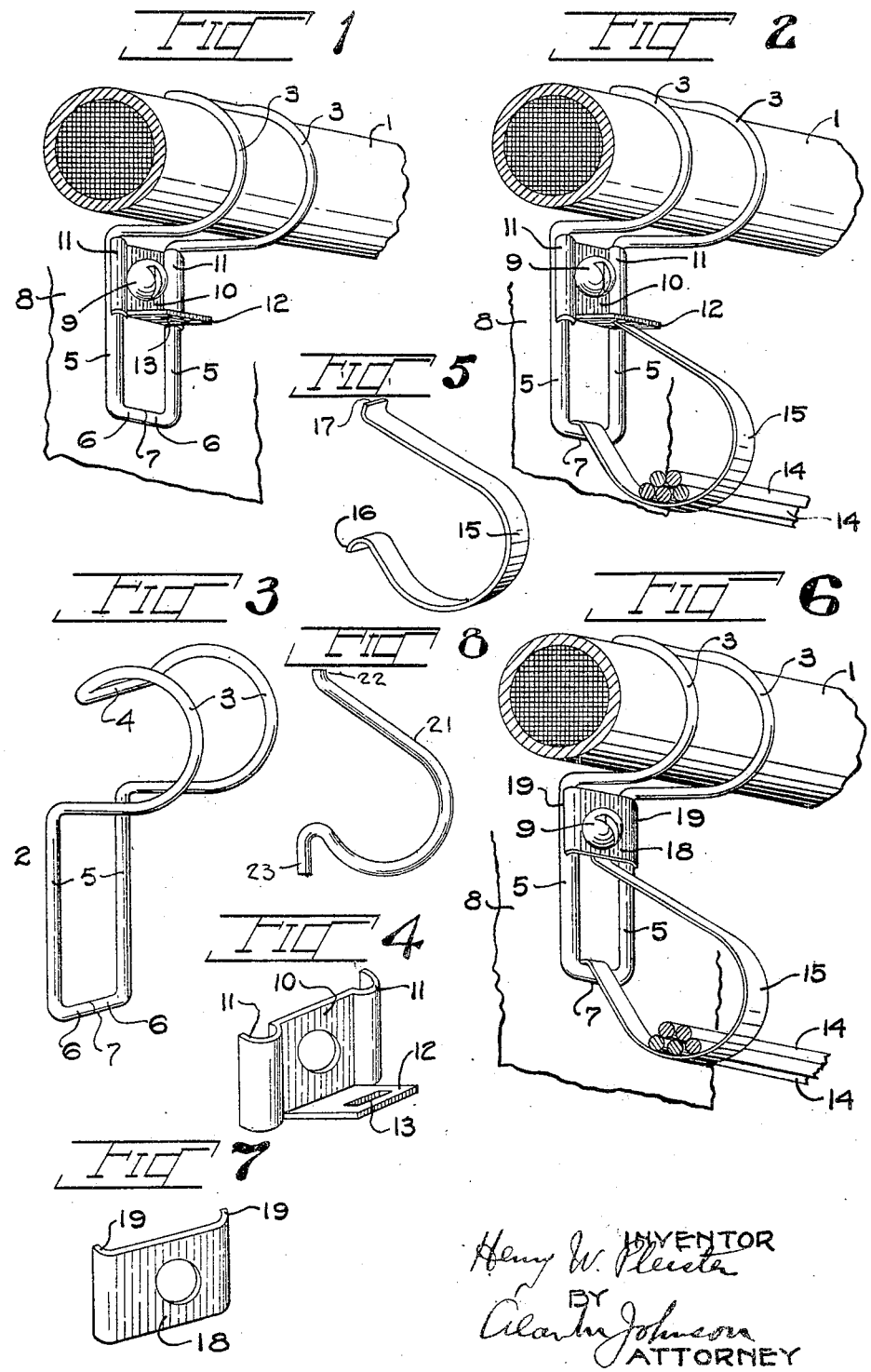

HENRY W. PLEISTER, OF WESTFIELD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,381,232.   Specification of Letters Patent.   Patented June 14, 1921.

Application filed August 17, 1920. Serial No. 404,172.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

My invention relates to a conduit or cable clamp and more particularly to one formed from wire. It further relates to such a wire conduit or cable clamp in which the arms forming the base are shaped to form a bearing for one hook of a bridle ring. My invention further relates to the combination of a wire conduit or cable clamp, a saddle, and a bridle ring which is partly supported by the saddle and partly by the wire clamp.

My invention further relates to certain combinations, details of construction and articles of manufacture, as will be more fully hereinafter described and pointed out in the claims.

In the figures, in which I have shown one embodiment of my invention, the same reference numerals refer to similar parts in the several figures.

Figure 1 is a perspective view of my wire bridle ring and saddle shown supporting a cable;

Fig. 2 is a perspective view, similar to Fig. 1, with the addition of a bridle ring having one of its ends supported by the saddle, and its other end supported by the wire cable clamp;

Fig. 3 is a perspective view of my wire conduit or cable clamp;

Fig. 4 is a perspective view of the preferred form of saddle;

Fig. 5 is a perspective view of the preferred form of bridle ring;

Fig. 6 is a perspective view of a modification;

Fig. 7 is a perspective view of a different form of saddle which is used in the construction illustrated in Fig. 6.

Fig. 8 is a perspective view of a modified form of bridle ring.

Prior to my invention it has been customary to support the heavy lead covered conduits or cables 1 by means of cable clamps formed from heavy castings of iron or similar metal, and also by cable clamps formed from pressed sheet steel. By my invention I form a much cheaper conduit or cable clamp which will do the heavy duty required to support the heavy lead covered cables and which will not bend or break under the heavy normal strains, nor will it fail under abnormal strains due to sleet, wind and ice.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form a wire conduit or cable clamp 2 by bending a strand of wire back upon itself, forming the wire hooks 3, 3 and the connecting member 4. The ends of the wire are then brought parallel to each other to form the arms 5, 5. The very ends 6, 6 are bent toward each other and preferably, though not necessarily, contact with each other to form a bearing 7. The arms 5, 5 and ends 6, 6 form the base of my wire conduit or cable clamp.

This clamp 2 is held to any wall, or other suitable support 8 by means of a saddle and a securing screw 9. Different forms of saddles may be used. I have shown by way of illustration two such saddles, but it is of course to be understood that my invention is not to be limited to the particular forms shown.

In the preferred construction the saddle 10 is provided with the bent portions 11, 11 to take over the arms 5, 5 of the clamp and prevent lateral displacement thereof. The saddle is also provided with a flange 12 having a slot 13.

When the cable 1 is originally installed the wire conduit or cable clamp 2 and the saddle 10 would simply be employed as shown in Fig. 1. When, however, the capacity of the cable 1 becomes insufficient to carry the increased traffic load, it is merely necessary to string runs of bridle wires 14, 14 parallel to the cable. In my invention this is easily done by adding a bridle ring 15 having the arms or hooks 16 and 17. Preferably, though not necessarily, this bridle ring is formed out of stamped sheet metal. It can be readily attached to the conduit or cable clamp 2 by simply hooking the hook or arm 16 over the bearing 7, formed by the bent ends 6, 6 of the arms 5, 5 and then compress the bridle ring slightly so that the other hook or arm 17 will be forced beneath the flange 12. As soon as this hook or arm 17 comes into alinement with the slot 13 it will immediately snap into the slot. The bridle ring is securely held partly by the saddle 10 and partly by the wire clamp 2.

Should the traffic load at some future time fall off, due to change in population or shifting of business centers or from other causes, and it is found that under the new conditions that the cable 1 will adequately carry the traffic load, the runs of bridle wires 14, 14 and the bridle ring may be disconnected and removed, to be used in other locations if desired, by simply compressing the bridle ring 15 until the hook or arm 17 is disengaged from the slot 13. The hook 16 can then be lifted off the bearing 7.

In some cases I may use different forms of saddles. For example I have shown in Figs. 6 and 7 a saddle 18 having bent ends 19, 19 to engage over the arms 5, 5. In this form of my invention I do not provide the saddle with a flange or any particular engaging surface to coöperate with the hook or arm 17 of the bridle ring 15. In this form of my invention the hook 16 is hooked over the bearing 7, formed by the bent ends 6, 6, and the bridle ring is compressed sufficiently to permit the hook or arm 17 to snap behind the saddle 18. The resiliency of the bridle ring will securely hold it in the position shown in Fig. 6.

Having thus described this invention in connection with an illustrative embodiment thereof to the details of which I do not desire to be limited, what is claimed as new and what is desired to secure by Letters Patent is set forth in the appended claims.

What I claim is:—

1. The combination of a wire conduit or cable clamp, means to secure it to a wall or other suitable support, and a bridle ring partly supported by said means and partly by the conduit or cable clamp.

2. The combination of a conduit or cable clamp, means to secure it to a wall or other suitable support, and a closed bridle ring having two engaging arms, one of the arms coöperating with the securing means and the other with the cable clamp.

3. The combination of a conduit or cable clamp formed of wire, a saddle to secure the clamp to a wall or other suitable support, and a bridle ring having two hooks or engaging arms, one coöperating with the saddle, and the other hooking over a part of the wire clamp.

4. The combination of a conduit or cable clamp formed of wire, a saddle to secure the clamp to a wall or other suitable support, said saddle being provided with a flange having an engaging surface to engage and hold one end of a bridle ring, a bridle ring having two engaging hooks or arms, one of the hooks or arms coöperating with the flange and the other hook or arm contacting directly with the clamp.

HENRY W. PLEISTER.

Witnesses:
MARY R. RYAN,
ELIZABETH J. ROTH.